Figure 15:
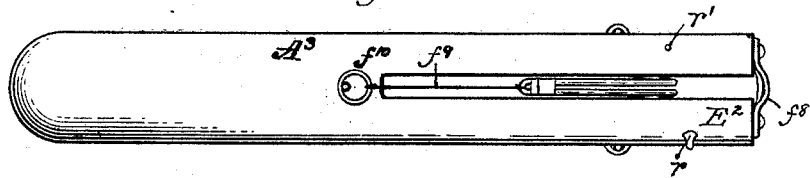

(No Model.) 6 Sheets—Sheet 1.
C. H. EMERSON.
BOOMERANG GUN.
No. 477,747. Patented June 28, 1892.
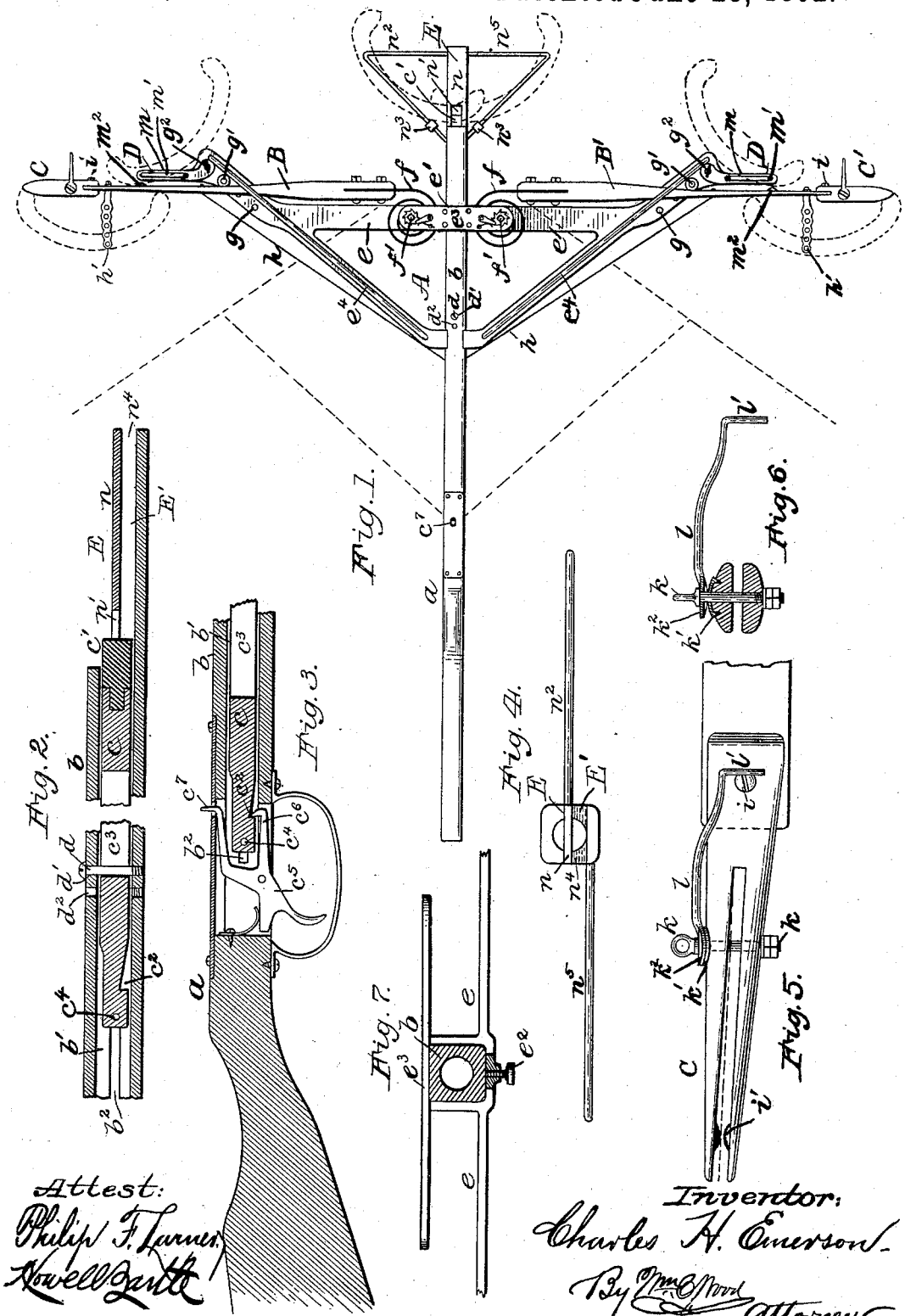
Attest:
Philip F. Larner
Nowell Barth
Inventor:
Charles H. Emerson
By Wm C. Wood
Attorney

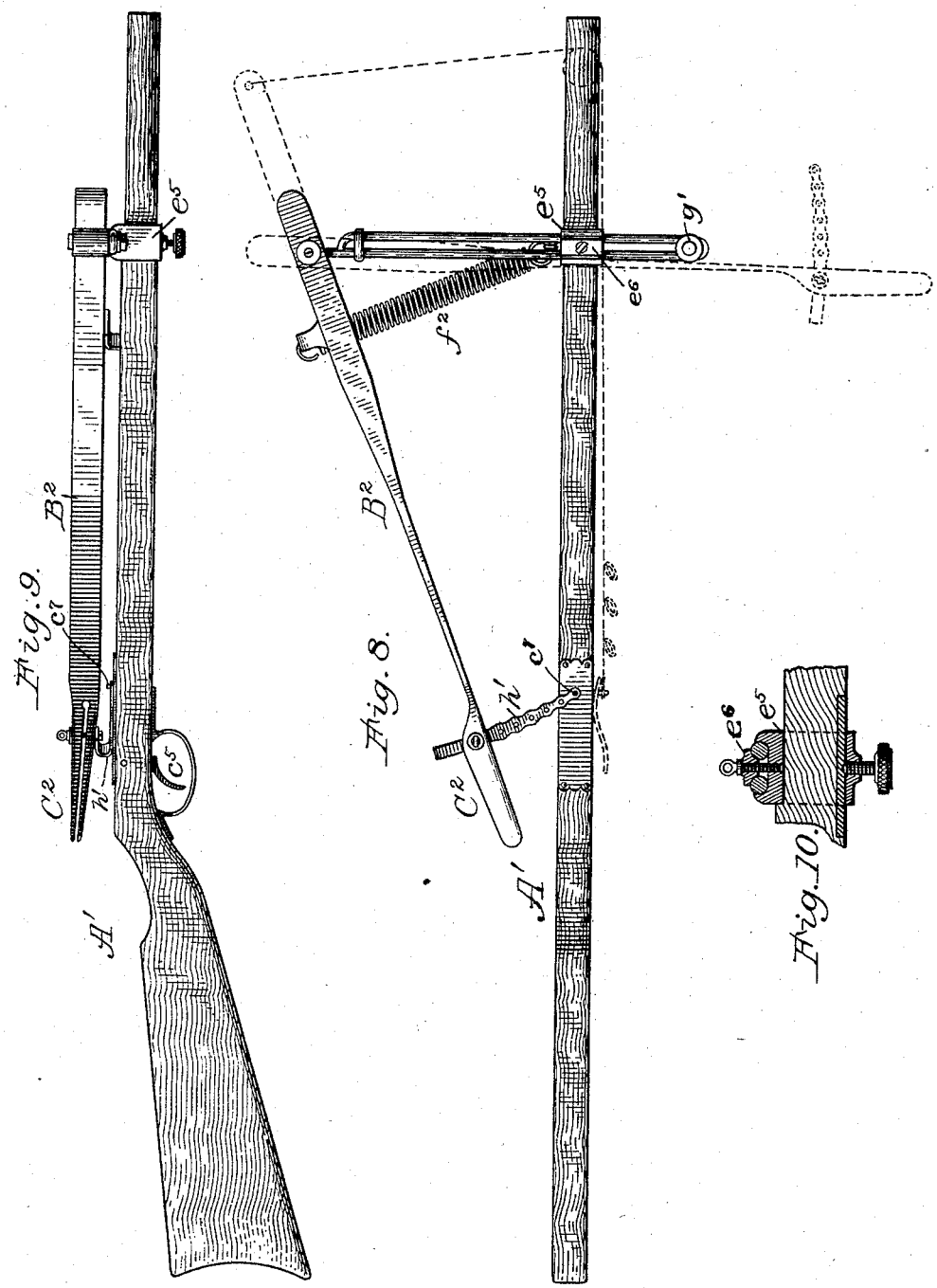

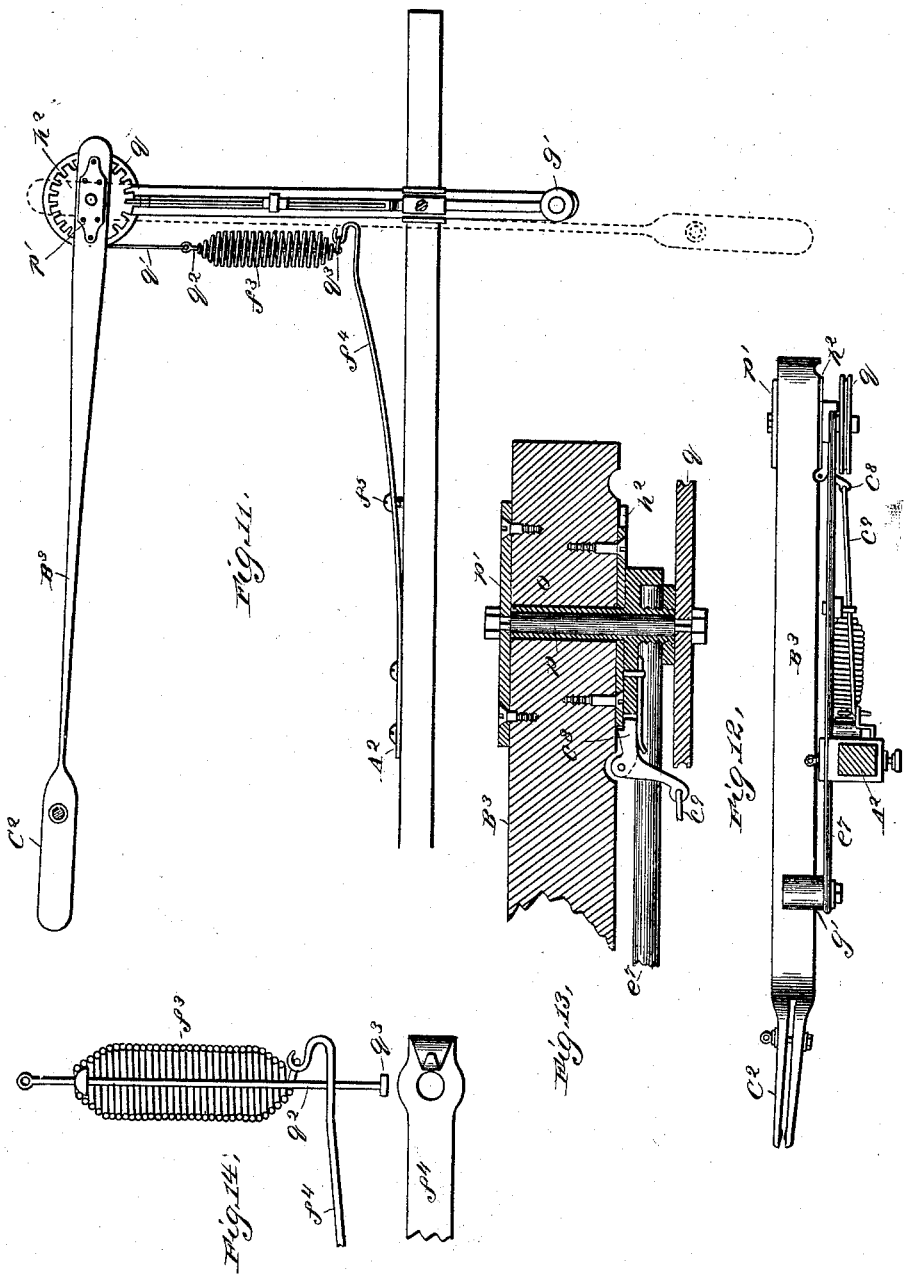

(No Model.) 6 Sheets—Sheet 4.

C. H. EMERSON.
BOOMERANG GUN.

No. 477,747. Patented June 28, 1892.

Attest:
Philip F. Larner
Nowell Bahle

Inventor:
Charles H. Emerson
By M. B. Mead Attorney (No Model.) 6 Sheets—Sheet 5.
C. H. EMERSON.
BOOMERANG GUN.
No. 477,747. Patented June 28, 1892.
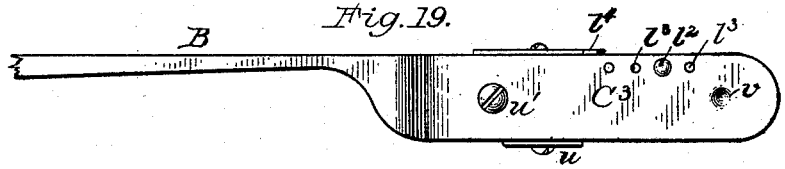
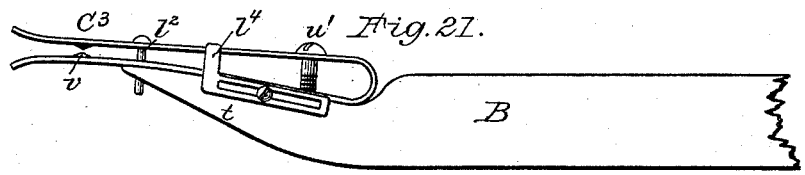
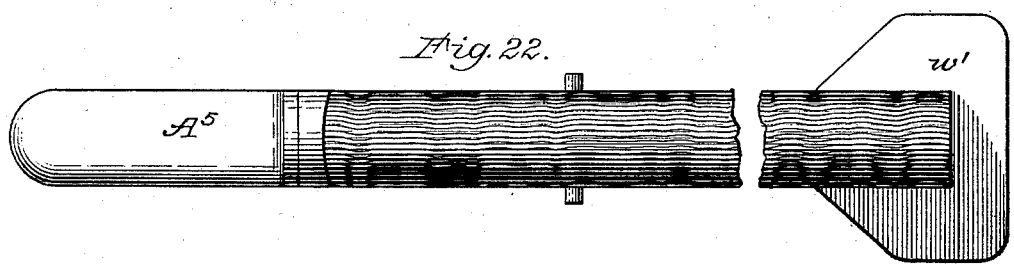
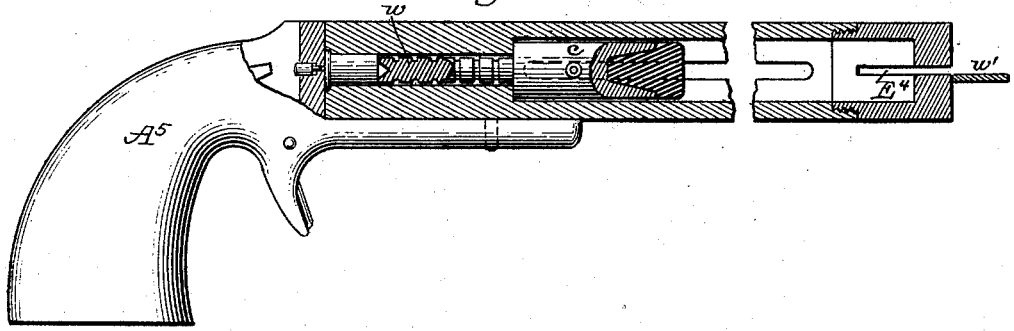
Attest: Philip F. Larner. Howell Battle.
Inventor: Charles H. Emerson. By McC Ward, Attorney.

(No Model.) 6 Sheets—Sheet 6.

C. H. EMERSON.
BOOMERANG GUN.

No. 477,747. Patented June 28, 1892.

Attest: Philip F. Larner, Lowell Smith

Inventor: Charles H. Emerson
By McWood
Attorney

UNITED STATES PATENT OFFICE.

CHARLES H. EMERSON, OF YONKERS, NEW YORK.

BOOMERANG-GUN.

SPECIFICATION forming part of Letters Patent No. 477,747, dated June 28, 1892.

Application filed April 8, 1891. Serial No. 388,071. (No model.)

*To all whom it may concern:*

Be it known that I, CHARLES H. EMERSON, of Yonkers, in the county of Westchester and State of New York, have invented certain new and useful Improvements in Boomerang Guns or Projectors; and I do hereby declare that the following specification, taken in connection with the drawings furnished and forming a part of the same, is a clear, true, and complete description of my invention.

It is well known that the boomerang has excited great interest throughout the civilized world, and that the principles involved in its construction and mode of operation have been made the subject of much scientific investigation. Prior to my invention there existed no means known to me which would enable a boomerang to be projected under absolutely uniform mechanical conditions, and hence certain inevitably erratic operations during a flight have added to what have been widely deemed the mysteries of the boomerang. Even among the Australians and in the hands of those admitted to be expert in the use thereof the erratic movements of the boomerang have been noticeable to a degree far beyond what would naturally be incident to variations in wind currents and pressure. It has therefore been generally accepted as a fact that mere chance was involved if a boomerang should be thrown so as to be operated in like manner during, say, two successive flights, and therefore some scientific writers have expressed the opinion that the boomerang could never be made to operate with precision, either as to distance and exact direction of outward flight or as to its path during return or as to its final striking or resting point, even when the prevailing atmospheric conditions were absolutely neutral. As a result of my invention I have demonstrated that a boomerang under ordinary atmospheric conditions can be projected mechanically and made to operate with substantial uniformity, and that with practice and experience quite heavy conflicting wind-currents can be so far overcome as to frequently secure very similar consecutive flights.

I am not the first to devise means by which a boomerang may be mechanically projected, and it is to be understood that my improvements have for their object such a reliability and capacity for operation as will enable practically-uniform results to be secured and also enable comparisons of flight to be made as between boomerangs simultaneously projected under like or different conditions—such, for instance, as variations in gyration, both as to direction and rapidity, and also variations in planes of motion.

Guns embodying my invention I believe should be graded as scientific toys, inasmuch as their use cannot fail to interest persons of high scientific attainments, and especially those to whom the boomerang has been deemed worthy of study and investigation. As toys for general use they will possess, however, their greatest commercial value, inasmuch as they can be employed as implements in certain interesting outdoor and even indoor games founded thereon.

After describing in detail various forms of guns embodying my invention, as illustrated in the drawings, the features deemed novel and appropriate to this specification will be duly specified in the several clauses of the claims hereunto annexed.

Figure 16:
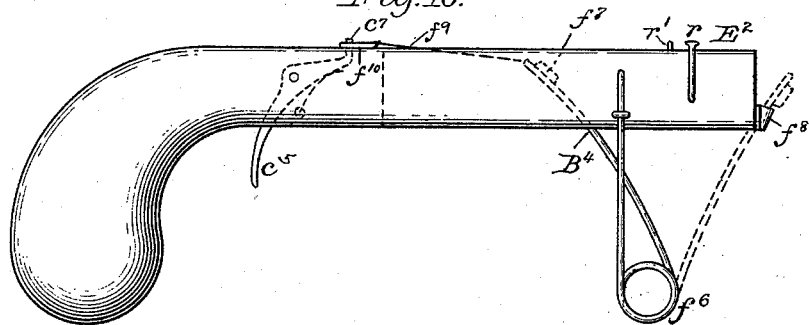
Figure 17:
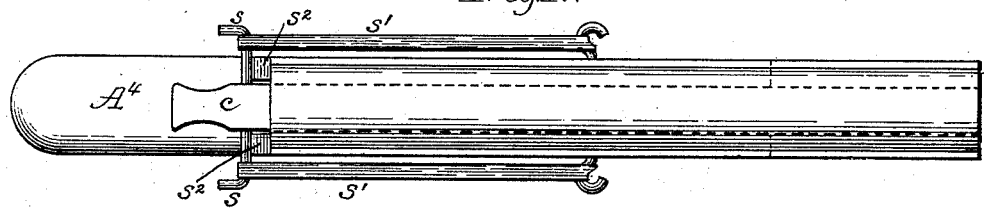
Figure 18:
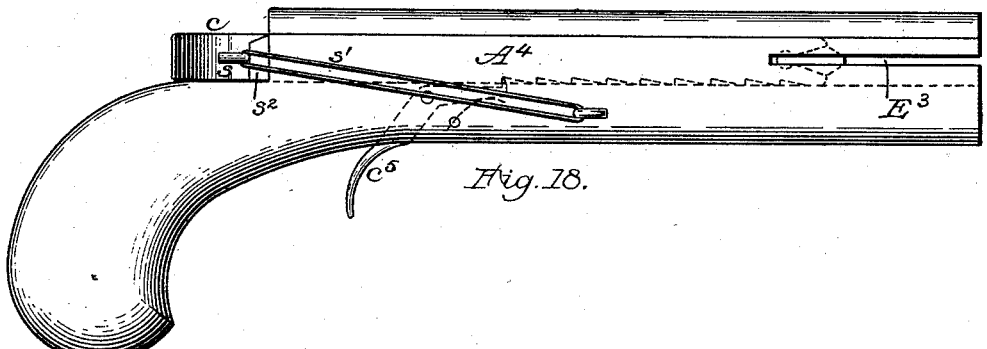
Figure 24:
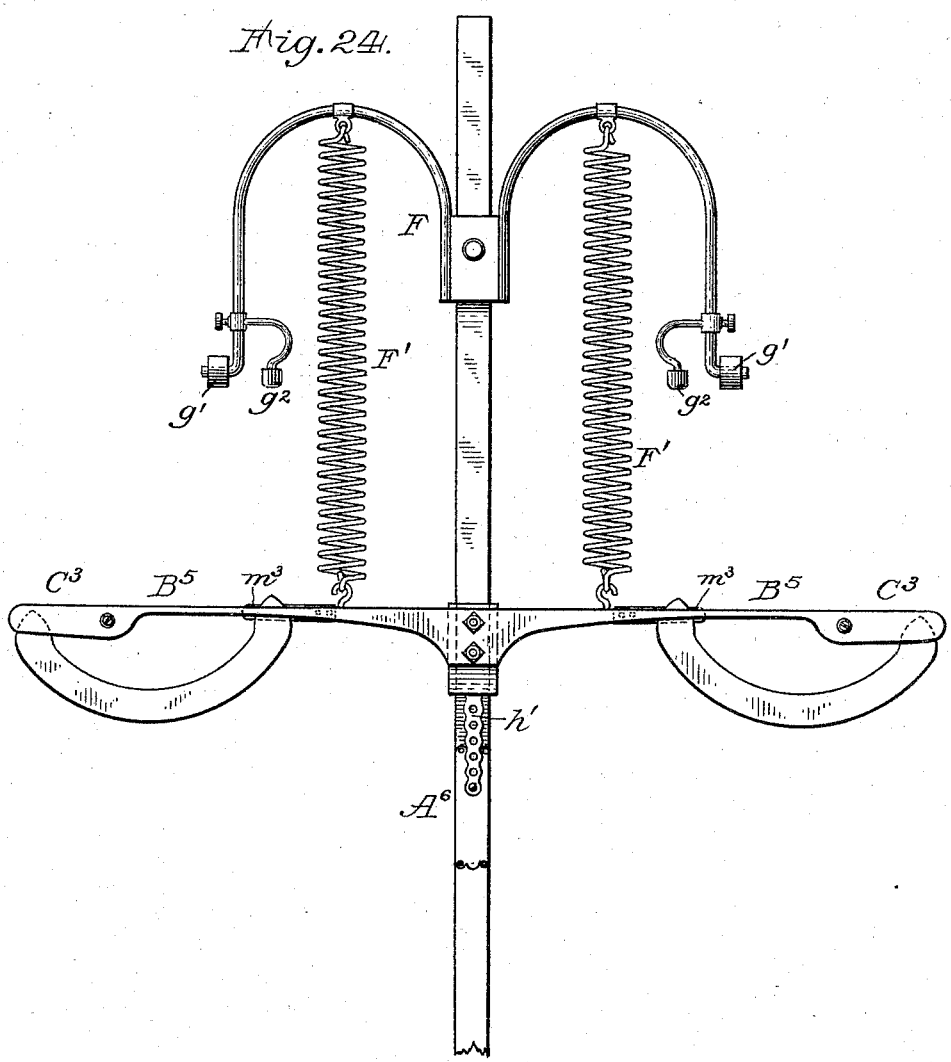

Figure 1 in plan or top view illustrates one of my boomerang-guns in one of its most complex forms, appropriate dotted lines in said figure indicating six boomerangs in position to be projected. Fig. 2 is a longitudinal vertical sectional view of the "muzzle" portion of the gun on a scale larger than in Fig. 1. Fig. 3 is a similar view of the breech portion. Fig. 4 is a front end or muzzle view of the gun, showing two boomerang-holders in their simplest form. Fig. 5 is a side view of one of the boomerang-holders of a more complex form. Fig. 6 is a lateral section of the holder, Fig. 5, on the line of its controlling-bolt. Fig. 7 is a lateral section of the gun at the junction of the barrel with the front portion of a triangular frame-piece, on which spring-arms are mounted. Fig. 8 in top view illustrates one of my guns, which, although capable of throwing but one boomerang, is specially well adapted for securing long flights of large boomerangs. Fig. 9 is a side view of the same. Fig. 10 is a sectional view of the gun at the junction of its barrel with the spring-arm frame. Fig. 11 in plan view illustrates the main parts of a gun having a spring-arm, which can be set at any desired angle and swung throughout a half-circle, or even more, if desired. Fig. 12 illustrates the same, with the gunstock in cross-section and the swinging arm and its frame in side elevation. Fig. 13 is a vertical section of the spring-arm and frame on the line of the pivot-bolt, by which the arm is mounted on the frame. Fig. 14 is a section view of the coiled spring and the flat spring illustrating their connections. Figs. 15 and 16 in side and top views illustrate one of my boomerang guns or pistols adapted to indoor service. Figs. 17 and 18 in side and top views illustrate another of my small guns or pistols. Figs. 19, 20, and 21 in top and two side views illustrate a modification of a boomerang-holder of the spring-jaw variety. Figs. 22 and 23 illustrate in top view and section one of my guns wherein explosive compounds may be used. Fig. 24 in top view illustrates one of my double guns having non-pivoted spring-arms.

I will first describe the gun shown in Figs. 1 to 6, inclusive, this being in one of its most complete and expensive forms and capable of projecting six boomerangs in simultaneous flight or any lesser number. The organization of this gun enables boomerangs to be projected in pairs, and hence those in each pair will make their flights under practically uniform mechanical conditions, and each of the entire number during a simultaneous flight will encounter substantially similar atmospheric conditions with respect of density and rarity, and including, of course, prevailing wind-currents.

The gun A has a breech $a$ of suitable form, usually composed of hard wood, although other material may be used. The barrel $b$ is provided with a longitudinal chamber $b'$, after the manner of an ordinary gun, and, as in prior cross-bow guns, the barrel is slotted laterally, as at $b^2$, for a portion of its length for the reception of a wire or cord, or of eyebolts, to which the bow-cords may be attached. Within the barrel there is a suitable plunger $c$, specially shown in Fig. 2, having a rubber tip or buffer $c'$ at its front end, and at its lower side at its rear end a trigger-notch $c^2$. The central portion of the plunger is longitudinally and vertically slotted, as at $c^3$, for the reception of a vertical stop-pin $d$, which limits or restricts the forward movement of the plunger. This pin is adjustable in that the barrel of the gun has two holes at $d'$ and $d^2$, the latter being at the rear of the first, and hence, if the stop-pin should be located therein, the extent of the forward movement of the plunger would be appropriately restricted. At the rear end of the plunger there is a lateral hole $c^4$, which may either be occupied by a bolt projecting laterally through the slot $b^2$ or by a bow-cord, as will be hereinafter described.

Two laterally-extended spring-arms B and B' are secured to the barrel of the gun by means of a triangular frame $e$, having a socket for the barrel at $e'$, and it is mainly secured to the barrel by means of a clamp-screw $e^2$ and cap-plate $e^3$, as shown in Fig. 7. Each spring-arm is provided with a powerful spring $f$, located in the space between the frame $e$ and the cap-plate, each spring having an arbor $f'$, squared at its outer end and provided with a ratchet-wheel and a spring-pawl, thus enabling the spring to be adjusted as to tension. The main portion of each spring-arm is composed of wood or other material specially selected with reference to its resiliency, and it is so shaped or formed as to afford prompt spring movements, as will hereinafter be further explained. The inclined portions of the frame $e$ are each provided with an overlying-rod $e^4$, thus affording guide-slots occupied by the spring-arms for restricting them in their movements to a plane at right angles to the axes of the springs $f$. The frame-arm $e$, being readily applied to and detached from the barrel, enables the gun to be dismantled and packed within a comparatively small space.

At each of the two outer ends of the frame there is a series of holes, as at $g$, for the reception of a buffer-stop $g'$, consisting of a bolt and an elastic tubular cushion, against which the spring-arm will strike when permitted, as for projecting a boomerang, and the several holes enable a varied adjustment of the buffer-stop. A bow cord or wire $h$ is attached to the two spring-arms and passes through the slots $b^2$ and the hole $c^4$ in the spring-plunger $c$, and when retracted the trigger $c^5$, with its arms $c^6$, will engage with the trigger-notch $c^2$ in said plunger and maintain the arms and plunger in position for service. With the parts as thus far described the spring-arms can both be retracted for action into positions indicated by dotted lines; but I have provided for a much wider range of movement by means of a trigger-plate $h'$ near the outer end of each arm, said plate being perforated, as shown, to enable it to be engaged by and readily released from the trigger $c^5$, which has an upper arm $c^7$, projecting its tip above the top surface of the gun, as clearly shown in Fig. 3. With these trigger-plates either or both spring-arms may be retracted into positions substantially parallel with the barrel of the gun, thus affording a swinging path for either arm covering quite ninety degrees. In some of my simpler guns the trigger-plate $h'$ is projected forwardly from the arm, thus enabling said arm to be retracted still farther and to partially overlie the barrel. Similarly-arranged trigger-plates can be used in this gun; but in that case the two spring-arms could not be put into simultaneous action.

This gun has six boomerang-holders, four of which are in pairs, and those of each pair are substantial counterparts, but the other two differ somewhat from each other. All of the boomerangs are projected by the operation of the spring-arms; but said arms deliver their projecting force to the boomerangs under what may be termed three different "modes of operation." Two of said modes are so far alike that in both the boomerang, being at rest, is forcible struck, while in the third mode it is swung forwardly with great rapidity and released with a powerful kick or jerk, due to the reactionary force of the spring-arms. The three so-termed "modes of operation" are, however, so far alike that in each case the boomerang will not only be projected in a right line, but also rapidly gyrated or rotated. Each spring-arm at its outer end is provided with a boomerang-holder C or C', having spring-jaws, between which the proper "spur" or end of a boomerang is inserted. In its simplest form the jaw-holder will be afforded by a slot of proper width in a piece of springy wood; but in this case it is provided with means for operating the jaws in grasping and releasing a boomerang, and said holder may be integral with the spring-arm; but as angular adjustments are desirable, these holders C C' are each secured to their arms by a lateral pivot-bolt $i$.

As shown in Figs. 5 and 6, the holder C is provided with a transverse clamp, which is shown here as a bolt $k$, transverse to the jaws, and below the head of the bolt, and non-rotatively in contact with the top of the holder there is a transversely-convex washer $k'$. A lever or arm $l$ is pivoted upon said bolt, and it operates as a cam-lever, because at its inner end it is provided with a tranversely-concavo-convex disk $k^2$, which overlies the washer $k'$ and is closely confined between it and the head of the bolt $k$. When the disk $k^2$ lies with its under transversely-concave side in full contact with the convex top of the washer $k'$, as shown in Fig. 5, the jaw-holder (or slot) stands open to its fullest extent; but when the arm $l$ has been swung so as to stand at right angles to the side of the holder, as shown in Figs. 1 and 6, the disks serve as cams, and hence the jaws will be forced together, (or the slot partially closed,) as indicated by a dotted line in Fig. 5, because of the compressing effect of the upper disk, its two drooping surfaces or edges then riding on the two raised edges or surfaces of the lower disk. The outer end of said arm $l$ is bent at a right angle, as shown, and this serves as a releasing-abutment $l'$, as will be hereinafter fully explained.

As a rule I provide the jaw-holders with convex or inwardly-projecting clamping-surfaces, as are clearly shown at $i'$ in Fig. 5, these being preferably afforded by well-secured coincident disks of leather or wood. This pivotal grip by the jaws upon a boomerang will always be conducive to good flights.

As before indicated, the holders C and C' are counterparts, and therefore the description of one will apply to both. The boomerang-holders D and D' are also counterparts and each includes a portion of or it may be adjustably attached to the extremity of the frame $e$. As shown in Fig. 1, each holder includes an arm $m$ (pivotally connected to the frame $e$ by means of a clamp-bolt $g^2$) and a light flat spring $m'$ on the flat side of said arm, said side affording a supporting-surface between which and said spring a boomerang may be interposed, with a portion of its edge projected toward the adjacent spring-arm. The projecting blow is delivered against the edge of the boomerang by the spring-arm, which is provided on its side with a suitable buffer or cushion $m^2$. These holders may each be variably adjusted on its clamp-bolt, and thus provide for the delivery of the projecting blows under the most favorable conditions. In some of my guns I dispense with the pivoted arm $m$ and provide a supporting-notch or two small light springs operating like a thumb and finger, and locate them at the corner projections of the frame $e$ beyond the pivotal points of the arms $m$.

At the outer end of the gun the boomerang-holders E and E' are located. The holder E is a mere supporting-platform, afforded in part by a thin plate $n$, slotted at its inner end, as at $n'$, to admit of the advance of the buffer $c'$ on the front end of the plunger $c$, as clearly indicated in Fig. 2. At the one side of said plate and in the same plane there is a lateral wire frame $n^2$, as shown in Figs. 1 and 4, the upper side of which serves as a supporting-surface for a boomerang when placed in or on this holder, as indicated by the dotted lines in Fig. 1. This frame is sometimes provided on its inclined rear portion with a sliding block, as at $n^3$, which will serve as an adjustable shoulder, with which the rear edge of a boomerang may engage and enable it to be more firmly seated when the gun is to be elevated. The holder E' is below the holder E, and it includes a lateral slot $n^4$ below the plate $n$, the bearing-surface of said slot being supplemented by a wire frame $n^5$ like the frame $n^2$. It will be readily seen that boomerangs will be projected from the holders D D' and E E' by striking blows; but the delivery of boomerangs from the holders C C' involves a preliminary throwing force, applied during the quick swinging movement of a swinging arm, supplemented by a powerful kick or jerk when the arm strikes against its cushioned stop or buffer. One spur or tip of the boomerang is lightly grasped between the jaws of the holder, the other tip lying adjacent to the side of the spring-arm, and during the swinging movement of the arm the boomerang will rarely vary in its position; but as soon as the arm strikes against its buffer-stop the boomerang swings outwardly in the holder nearly in a complete circle, and with the kick or recoil of the arm it is projected upon its gyratory flight. In using these particular holders the outer edge of the boomerang as it is swung around strikes against the releasing-abutment $l'$ on the clamping-lever $l$, imparting to the latter a sufficient movement to secure a prompt release of the boomerang by the opening of the jaws of the holder. The lever $l$, being composed of wire, may be readily bent, thus enabling the abutment $l'$ to be variably adjusted, so that it may be struck by the boomerang at the most favorable portion of its pivotal movement in the holder.

It is to be understood that some of my boomerangs are specially adapted for gyrations in one particular direction, and they are therefore either "right-hand" or "left-hand" boomerangs, and each pair of holders may receive one of each kind.

As shown in Fig. 1, six boomerangs (indicated in dotted lines) may be projected practically simultaneously, or either pair may be thrown without the others, or either one of either pair may be made to make its flight. If six be thrown, three will gyrate in their flight toward the right hand and three toward the left, but all will be projected in an upwardly-inclined but straight line, and at the termination of their outward flight they will return, as a rule, substantially on the same line, and especially if not adversely affected by air-currents. Some of my boomerangs are adapted for use either as rights or lefts; but the direction of their gyratory rotations during a flight will of course depend upon the particular holder from which they may have been projected. It will be obvious that the practically simultaneous flight of two or more boomerangs from substantially the same point will afford specially interesting opportunities for comparing the aerial capacities of boomerangs, which are more or less varied in the matter of contour, thickness, weight, &c. Each of the several capacities for adjustment of the several parts have their value in enabling investigators, from a scientific standpoint, to quite widely vary the mechanical conditions under which flights may be made, and also to compensate for wind-pressures, as well as to vary the projecting force in proportion to the size and weight of each boomerang.

For securing specially-long flights with comparatively-large boomerangs, I prefer to provide for single flights, and hence I have devised a comparatively-heavy gun having a single spring-arm and holder, as illustrated in Figs. 8, 9, and 10. Smaller guns of this type, but lighter and cheaper, are also desirable, and these will profitably embody more or less of the several features of my invention. This gun $A'$ has no tubular barrel, the stock beyond the breech being solid, except where it is chambered for the reception of the trigger mechanism. The spring-arm $B^2$ in this gun is all in one piece, composed of resilient wood thick at its butt, thin centrally, and having at its end a boomerang-holder $C^2$, which is of the spring-jaw form before described, but is integral with the arm. It is, however, provided with an adjusting-bolt for closing the jaws to any desired degree, and a trigger-plate $h'$ is attached to the arm by means of said bolt; but in this case said plate, as shown, projects from the front side of the arm instead of from the rear side; but it may be swiveled on its bolt into said rearward position, if desired. In this holder the adjusting-bolt has been so accurately located that it may serve, also, as a releasing-abutment, inasmuch as the boomerang pulls itself away from the jaws of the holder as a result of its outer edge striking said bolt, although the jaws are not opened, as with the automatic releasing-abutment $l\ l'$, described in connection with Figs. 1 and 5. This spring-arm is pivoted at its butt upon a strong bolt secured to the outer end of an arm-frame, which is composed of round rods parallel with each other and affords a longitudinal slot, and this frame is secured to the gunstock by means of a yoke $e^5$, encircling the stock, and a clamp-plate $e^6$, beneath which the frame may slide longitudinally and be clamped in any desired position, thus securing longitudinal adjustment. A powerful spring $f^2$ is secured at one end to the yoke $e^5$ and at the other to the spring-arm $B^2$ at an appropriate point between its pivot and the holder $C^2$. It will be seen that the longitudinal adjustment of the frame will effect a corresponding adjustment of the force of said spring. At the opposite end of the arm-frame there is a stop or buffer $g'$, consisting, as before described, of a bolt and a tubular rubber cushion, and this buffer is also adjustable on the frame longitudinally the bolt having a shoulder, which rests on top of the frame, and a clamp-nut beneath, this providing for adjustment of the buffer with relation to the pivotal point of the spring arm or, otherwise stated, with relation to the holder $C^2$. The trigger $c^5$, with its upwardly projecting arm $c^7$, is as before described, and it in like manner engages with and releases the trigger-plate $h'$.

As thus far described the swinging spring arms are adapted to sweep within a radius of ninety degrees; but this may be and has been by me increased in some of my guns of this type, as will be now described in connection with Fig. 8. It will be understood that in said guns the point of connection between the spring and the spring-arm is located nearer the holder $C^2$ and that the butt of the arm is prolonged, as indicated in dotted lines. The front end of the stock was laterally mortised, and in it is housed a grooved pulley. A strong cord or fine wire is attached to the butt-end of the spring-arm, carried over the grooved pulley, and back within a few guide eyes to the trigger. The cord at its free end is provided with one or more loops or rings for engaging with the trigger-arm. With said organization the spring-arm has a sweep of at least one hundred and twenty degrees but the use of the cord in that manner involves some little inconvenience, and hence for securing similar results I have introduced in the place of the grooved pulley an auxiliary trigger connected by a wire with the trigger $c^5$, and I also attach to the butt-end of the spring-arm a flexible perforated trigger plate for engaging with the auxiliary trigger With the two forms of gun thus far described a varied range of swinging movement by the spring-arms has been provided for; but nevertheless with both of them there are certain intermediate ranges of movement which are not available. For securing a universal range of movement, and at the same time providing for a swinging movement of one hundred and eighty degrees or more, I have devised a comparatively complex and expensive gun, in which the spring never varies in its position with relation to the spring-arm, and, moreover, in said gun a powerful flat spring may be employed in connection with a spiral or coiled spring, and either or both of said springs may be used. With said gun it is practicable to impart to the swinging arm a movement of about two hundred and seventy degrees; but in such case the grip by the holder on the boomerang must be very strong, so as to prevent its centrifugal discharge prior to the striking of the buffer-stop by the spring-arm.

Referring to Figs. 11 to 14 inclusive, it is to be understood that in this gun $A^2$ the spring-arm $B^3$ is as before described, and it has a suitable boomerang-holder $C^2$. This arm-frame $e^7$ resembles the frame in Fig. 8, and the spring-arm at its butt-end is provided with a circular notched trigger-plate $h^2$, which performs the function of the trigger-plates before described, and the axis of the spring-arm pivot is the axis of said plate. The said pivot is a hollow stationary stud $o$, rigidly projecting from the end of the frame $e^7$; but within said stud there is a shaft $p$, squared at its outer end for engagement with a plate $p'$ on the spring-arm, having a square hole snugly occupied by the square end of the the shaft and well clamped by a nut, as shown. At the opposite or lower end of said shaft $p$ there is a wheel $q$, which may be segmental, having a grooved periphery for the reception of a cord or flexible wire $q'$ or metal band, which is secured to said wheel and also in a peculiar manner to one end of a coiled spring $f^3$, the other end of said spring being either attached to the stock of the gun or to a clamp adjustable on the frame, or, as shown, to the hooked tip of a powerful flat spring $f^4$, bolted firmly at its base to the side of the gun and provided with an adjusting-screw $f^5$. Within the coiled spring there is a rod $q^2$, having a collar suitably connected with the outer end of the coiled spring, so that when said rod is connected with the cord or wire $q'$ and the latter is secured to the wheel $q$ the swinging of the arm $B^3$ rearwardly will distend the spring. The rear end of the rod $q^2$ has a button or collar $q^3$, which, when the coiled spring has been put under its maximum tension, will abut against the rear end of said spring, and then a further rearward movement of the spring-arm $B^3$ will cause a deflection of the heavy flat spring $f^4$, the latter below its hooked tip being wide and provided with a hole, through which the rod $q^2$ and its button $q^3$ may freely pass.

The notched trigger-plate $h^2$ has been referred to, and it is now to be understood that a trigger $c^8$ is laterally beveled on top, so that the trigger-plate in rotating may pass freely over it, although the trigger will occupy each notch successively and will engage with such one of them as may be desired, and so hold the spring under tension and with the arm ready to swing. This trigger $c^8$ is operated by a finger-trigger, in the usual position near the breech, by means of a wire parallel with the gunstock and a bell-crank lever within the stock adjacent to its junction with the arm-frame and respectively connected with the finger-trigger wire and to a wire $c^9$, which is connected to the trigger $c^8$. Instead of the wires and bell-crank lever, a single length of fine very flexible wire cord may be employed, a grooved pulley being located where the bell-crank lever is and the wire being connected with the finger-trigger and the trigger $c^8$.

With this gun the combined force of two springs may be applied to the projection of one boomerang, as in the gun, Fig. 1, although in the latter case this is done by way of a plunger and with a striking blow; but it will be obvious that this gun may readily be provided with a boomerang-holder corresponding with the holder D of Fig. 1, so that this powerfully-driven spring-arm may operate as a "striker" in projecting a boomerang. This gun has also an adjustable stop or buffer $g'$, and it is struck by the spring-arm in the manner already described. It will be seen that with the two springs organized as in Fig. 11 the heavy flat spring exerts its force in overcoming the inertia of the arm at the beginning of its movement, and then the prompt action of the more-delicate-coiled spring follows and continues during the remainder of the swinging movement of its arm.

It will be readily understood that the boomerang-holders may be widely varied as to details in construction without departure from the main features of my invention; but I deem it desirable to illustrate at least one other form of holder which is well adapted for use on cheap swinging-arm guns. This holder is shown in Figs. 19, 20, and 21. In this instance the spring-arm B has at its outer end a suitable enlargement $t$, having a flat broad top slightly inclined upwardly, upon which the spring-jaw holder $C^3$ is mounted. This holder is composed of thin sheet spring metal (steel or brass) in one piece, partially bent upon itself to afford jaws, but having a lateral portion, which is bent downwardly at right angles, as at $u$, to enable it to be fastened, as by a screw, to the front side of the arm at its end $t$. A screw at $u'$ passes through both jaws into the wood, thus enabling the upper jaw to be deflected by the head of the screw to any desired degree of adjustment. Near its outer end the holder has one or two coincident indentations, as at $v$, which at their interior surfaces will serve as pivotal points, like the surfaces $i'$ in the holder, Fig. 5, between which an inserted boomerang will be pivotally gripped, and thus secure a free swinging movement of the boomerang just prior to making its flight. In this form of holder a releasing-abutment consists of a stud or pin $l^2$, adjustably located in some one of the several holes $l^3$. The tightening-screw $u'$, serving as a transverse clamp in this form of metal-holder, is not favorably located for operating properly as a releasing-abutment, and the pin and the holes do not enable as precise an adjustment as is desirable when boomerangs of various sizes and weights are to be projected. I have therefore provided the holder with an adjustable releasing-abutment $l^4$, which is mounted at the rear side of the holder and has a tail-piece longitudinally slotted for the reception of a clamp-screw, as clearly shown, thus providing for sliding the abutment into precise positions of adjustment.

The use of my heavy boomerang-guns will, of course, be restricted to the open air; but I have devised small light guns which are in the general form of pistols, and when these are used with appropriate small light boomerangs they are adapted to indoor pastimes, and may be used in very entertaining competition in the way of securing accurate return-flights or the encircling of chandeliers preparatory to the return-flight. One of these small guns is illustrated in Figs. 15 and 16. In this case the gun $A^3$ is in the form of a pistol, and it is provided with a trigger $c^5$, having its arm projecting, as before described, above the upper surface of the stock, as at $c^7$. The spring-arm $B^4$ in this gun is composed of hard wire and is an integral part of a coiled spring $f^6$, which has its fulcrum in a bent pendent stem secured to the sides of the stock. The end of the spring-arm is provided with a buffer $f^7$, which occupies a longitudinal vertical slot in the stock, and the arm is restricted against undue forward movement by a cushioned abutment across the end of the gun, as at $f^8$. A cord or wire $f^9$ is attached to the spring-arm, and at its free end it has a ring $f^{10}$ for engaging with the trigger when the spring-arm has been properly retracted. The trigger readily releases the arm, in a manner already described. The boomerang-holder $E^2$ is similar to the upper holder at the front end of the gun, Fig. 1, the adjacent portion of the top of the stock serving as a supporting-surface, and a headed stud $r$ and a second plain stud $r'$ enable a boomerang to be properly applied, so as to best receive the projecting blow from the spring-arm, and with the edge of the boomerang inserted between the head of the stud $r$ and the underlying surface it will be quite securely held in position.

Another form of my small guns is illustrated in Figs. 17 and 18, wherein a plunger is employed, generally after the manner already described, in connection with the gun, Fig. 1. The gun or pistol $A^4$ has its tubular barrel open at the rear. The rear end of the plunger $c$ is always exposed and it has two lateral arms $s\ s$, with which strong band or rubber springs $s'\ s'$ engage under tension, the front ends of said springs being secured to the outer sides of the stock. The under side of the plunger has a series of notches, with any one of which the trigger $c^5$ may engage, thus providing for varying the projecting force. Between the lateral arms $s\ s$ and the rear end of the barrel cushions $s^2$ are interposed for securing a reactionary effect at the front end of the plunger, which, as described in connection with Fig. 1, is provided with a rubber tip or buffer. The holder $E^3$ has a lateral slot for the reception of a boomerang, as with the corresponding holder in the gun first described.

My guns may be operated by the use of explosive compounds or of compressed air, and it is to be understood that in both cases the guns or pistols would preferably be like many of the ordinary air or powder guns with respect to the compressing-chambers and cartridge-chambers and also to the trigger and discharging mechanism. My guns, however, involve radical departures from prior guns of those types, in that mine are provided with one or more boomerang-holders in some form and are preferably not adapted to discharge air or gas from the muzzle; but are provided with suitable vents or openings between the firing-chamber and the muzzle, and, still further, my guns are provided with strikers or movable buffers in some form, which are actuated by the expansion of the air or gas, and their forces are so transmitted to a boomerang as to impart thereto both the right line and rotative movements. With guns of this type extraordinary speed of rotation or gyration may be secured, affording great steadiness during long outward flights and very accurate returns.

I have illustrated one of my powder-guns in Figs. 22 and 23, and it will be understood that this gun or pistol $A^5$ has a cartridge-chamber, firing mechanism, and a breech-loading capacity after the manner of the well-known Ballard gun. Within the barrel there is a sliding striker $c$, having a tail-piece $w$, which enters the closed rear portion of the barrel quite freely, and is provided with annular grooves for gas-tightening without undue friction. The body of the striker is of larger diameter than the tail-piece, but is light and strong and has a rubber tip, as already described. Lateral guide-pins through the striker occupy longitudinal open slots in the sides of the barrel, said slots affording free vents for the gases after they have driven the tail-piece beyond the smaller section or gas-chamber of the barrel. At the muzzle of the gun there is a boomerang-holder $E^4$ in the form of a lateral slot, supplemented by side plates or wings $w'$, having their upper surfaces in the same plane as the bearing-surface of the slot, thus affording a holder like the holders $E\ E'$ of the gun, Fig. 1, although in this holder a boomerang may be presented for making either right-hand or left-hand gyrations, as in the gun $A^4$.

It will be readily understood that the cartridges used in my boomerang-guns should contain no wads, in their ordinary form at least, and that the explosive matter should be in comparatively small quantities, and preferably of the quick-burning fulminate or cellulose varieties, from which but little smoke will be developed. If a powder-retaining medium should be required at the inner end of the cartridge, a thin disk of promptly-combustible paper can be relied upon. It will be obvious that no changes would be involved in the front portion of this gun, even if its rear portion should be organized to operate with compressed air.

It will be seen that the several boomerang-holders are in each instance jaw-holders, in that they are provided with coincident surfaces, between which a boomerang may be inserted flatwise and frictionally held in an accurate position.

The action of a resilient arm upon striking a suitable abutment or buffer is peculiarly desirable, and while this action is best secured by the use of a pivoted swinging arm, as already described, it can be fairly well obtained with a non-pivoted arm, if it be moved bodily in a straight line by its spring or springs, as illustrated in Fig. 24. In this gun $A^6$ there is a pair of resilient spring-arms $B^5$, united (or integral) at their butts and secured to a guide-block sliding freely on the barrel of the gun and provided with a trigger-plate $h'$ for engagement with the trigger, as before described. The two boomerang-holders $C^3$ $C^3$ are as before described; but each is supplemented by a light flat spring, as at $m^3$, between which and the edge surface of the arm one spur of a boomerang may be lightly held, while the other spur is properly engaged in or by the jaws of the holder, thus preventing the premature displacement of the boomerang. Near the muzzle end of the gun there is a frame F projecting laterally at each side and in a plane corresponding with that occupied by the arms $B^5$. A pair of coiled springs $F'$ are so connected to said frame and to the arms $B^6$ that on pulling the latter rearwardly and securing them by the trigger the springs will be set under proper tension. At the outer ends of the frame F there are buffers $g'$ $g'$, as before described, against which the arms strike at the termination of their forward movement. For forcibly releasing the boomerang from the custody of the springs $m^3$ I provide auxiliary buffers $g^2$ $g^2$. The projecting end of a boomerang strikes the adjacent auxiliary buffer $g^2$ a little in advance of the striking of the buffer $g'$ by the spring-arm, and therefore a prompt swinging movement of the boomerang in the holder is secured, although the clamping effect of the springs $m^3$ is sufficient to prevent displacement of the boomerangs during the forward movement of the arms and prior to their striking the buffers $g'$.

It would be obviously impracticable for me to state in each instance the dimensions of my several forms of gun or the relative proportions of the several parts thereof or the requisite capacities of the springs therein, all of which will, however, be fairly well understood by my stating that boomerangs as constructed by me are composed of various materials and are sometimes composite in their structure. Strong close-grained wood is the material mainly relied upon, and this is used solidly and in the form of veneers and in connection with cloth or paper. The boomerangs vary in length from four inches (parlor sizes) to twenty-four inches, and in width from one-half inch to two, and even two and one-half inches, and in thickness from one thirty-second of an inch to three or four sixteenths, and in weight they vary from a few grains to, say, six ounces.

My boomerangs in their best forms are provided with gage-marks, which enable them to be readily and accurately adjusted in either of the several forms of holder.

It is to be understood when a boomerang is projected from a gun that the spur which was in or nearest to the holder is always the advancing or pioneer portion of the boomerang, and that the projecting force is expended in what may be termed "two divisions," one of which induces the outward flight, or, in other words, the motion of translation, and the other division of the force is expended in causing the boomerang to make its rotations or gyrations throughout its outward and its return flight. It is also to be understood that rapidity in rotation or gyration is an important factor in securing long and steady flights, and hence the striking blow should be delivered with reference to securing specially-rapid rotation. It will be seen that whether the boomerang be projected from a gun by a striking blow, as from a plunger, or from a swinging arm when operated as a direct striker, or from a holder at the end of a swinging arm, the projecting force is applied to the boomerang in a manner so far substantially the same that in each instance said force is expended partially in effecting a right-line movement and partially in effecting the rapid rotatory or gyratory movement.

For partially indicating accuracy in operation I will state that any person with moderate experience or practice with one of my guns may cause a boomerang to make an outward flight in a straight line at, say, an angle of forty-five degrees upward, for a distance of from two to three hundred feet, and to then return in substantially the same line.

Although I have illustrated my invention in connection with only a few of the many forms of gun which I have devised, constructed, and applied to service, I believe my disclosures will be ample for enabling a full comprehension of the several features of my invention, and to also enable the embodiment of all or any of said features in various other forms without substantial departure from my invention.

Having thus described my invention, I claim as new and desire to secure by Letters Patent—

1. In a boomerang gun or projector, the combination, substantially as hereinbefore described, of a gunstock, a holding-jaw provided with coincident engaging-surfaces adapted to frictionally grasp and maintain a boomerang in proper position for making a flight, and means for projecting the boomerang from the holder in a right line and with a gyratory movement.

2. In a boomerang-gun, the combination, substantially as hereinbefore described, of two boomerang-holders and a spring-actuated swinging arm carrying at its outer end one of said holders and operating as a striker in connection with the second holder.

3. In a boomerang-gun, the combination, substantially as hereinbefore described, of a pair of swinging spring-arms, each having at its outer end a boomerang-holder, and both swinging in the same plane, but in opposite directions, for securing a practically simultaneous flight of two boomerangs in parallel lines, but with opposite gyratory movements.

4. In a boomerang-gun, the combination, substantially as hereinbefore described, of a suitable gunstock, several holders for variably maintaining an equal number of boomerangs in position for flight, spring-arms, and a plunger carried with said holders on said stock and adapted to simultaneously project all of the boomerangs from said holders in parallel lines, but causing some of them to gyrate in one direction and others in an opposite direction.

5. In a boomerang-gun, the combination, substantially as hereinbefore described, of a holder having coincident straight parallel holding-faces for receiving and accurately maintaining a boomerang in position for flight and a forcibly-actuated plunger for projecting a boomerang from said holder in a right-line movement and with rapid gyrations, said plunger being restricted in its forward movement to the rear portion of said holder and the coincident faces at the front portion of the holder serving to maintain the boomerang in a fixed plane after leaving the plunger and until it leaves the gun.

6. In a boomerang-gun, the combination, with a suitable boomerang-holder, of a striker for projecting a boomerang from said holder and means for varying or limiting the movement of the striker toward the holder, substantially as described.

7. In a boomerang-gun, the combination of a swinging spring-arm having a boomerang-holder at its outer end and an adjustable abutment or stop for said arm, substantially as described.

8. In a boomerang-gun, the combination, with a suitable holder for a boomerang, of an arm or striker and a tensionally-adjustable spring, substantially as described, whereby the projecting power of the gun may be varied, as well as the gyratory motion of a boomerang.

9. In a boomerang-gun, the combination, with a suitable boomerang-holder, of a projector or striker for discharging a boomerang from said holder, a spring for actuating said striker, a trigger, and means for variably coupling the striker therewith for correspondingly varying the force of the striker against the boomerang.

10. In a boomerang-gun, a holder having jaws provided with parallel contact-faces for receiving and grasping a boomerang flatwise and provided with a transverse clamp for varying the grip of said jaws, substantially as described.

11. In a boomerang-gun, a holder having jaws for receiving a boomerang and provided with an abutment, against which a boomerang will strike when swung in said holder for effecting its release therefrom, substantially as described.

12. In a boomerang-gun, a holder having jaws for receiving a boomerang and an adjustable abutment for varying the point at which a boomerang will strike said abutment just prior to making a flight, substantially as described.

13. In a boomerang-gun, a holder having jaws for receiving a boomerang, a cam-lever for varying the relations of the jaws and also serving as an abutment for a boomerang when swinging in the holder and enabling the boomerang to swing said lever in one direction, and thereby secure an automatic release from the jaws, substantially as described.

14. In a boomerang-gun, a jaw-shaped holder for receiving a boomerang and having on the inner faces of the jaws coincident convex or inwardly-projecting surfaces for affording a pivotal grip upon a boomerang when held therein, substantially as described.

15. In a boomerang-gun, a swinging spring-arm, in combination with a jaw-shaped boomerang-holder adjustably hinged to said arm by means of a clamping pivot-bolt, which is parallel with the plane in which the arm swings, substantially as described.

CHARLES H. EMERSON.

Witnesses:
PHILIP F. LARNER,
HOWELL BARTLE.